US008325648B1

(12) United States Patent
Shah et al.

(10) Patent No.: US 8,325,648 B1
(45) Date of Patent: Dec. 4, 2012

(54) METHODS AND SYSTEMS FOR ASSIGNING A WIRELESS COMMUNICATION DEVICE TO A CARRIER FREQUENCY

(75) Inventors: Maulik K. Shah, Overland Park, KS (US); Jason P. Sigg, Overland Park, KS (US); Jasinder P. Singh, Olathe, KS (US); Ashish Bhan, Shawnee, KS (US); Anil Singh, Leawood, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 856 days.

(21) Appl. No.: 12/432,298

(22) Filed: Apr. 29, 2009

(51) Int. Cl.
    *H04B 7/185* (2006.01)
(52) U.S. Cl. ........ 370/318; 370/343; 370/380; 370/381; 370/382
(58) Field of Classification Search .............. 370/312, 370/318, 343, 380–382
See application file for complete search history.

(56) References Cited

U.S. PATENT DOCUMENTS

| 5,617,059 A | 4/1997 | Eggleston |
| 5,796,722 A | 8/1998 | Kotzin et al. |
| 5,809,398 A | 9/1998 | Moberg et al. |
| 5,898,382 A | 4/1999 | Treatch |
| 5,898,681 A | 4/1999 | Dutta |
| 5,987,304 A | 11/1999 | Latt |
| 5,995,498 A | 11/1999 | Toot, Jr. et al. |
| 5,999,816 A | 12/1999 | Tiedemann, Jr. et al. |
| 6,002,664 A | 12/1999 | Schachter |
| 6,021,123 A | 2/2000 | Mimura |
| 6,038,448 A | 3/2000 | Chheda et al. |
| 6,047,191 A | 4/2000 | Desgagne |
| 6,088,590 A | 7/2000 | Anderson et al. |
| 6,119,005 A | 9/2000 | Smolik |
| 6,132,306 A | 10/2000 | Trompower |
| 6,289,724 B1 | 9/2001 | Varma et al. |
| 6,295,453 B1 | 9/2001 | Desgagne et al. |
| 6,360,098 B1 | 3/2002 | Ganesh et al. |

(Continued)

FOREIGN PATENT DOCUMENTS

EP 1 294 203 3/2002

(Continued)

OTHER PUBLICATIONS

Spotwave Wireless, Inc., SpotCell™ 112 (PCS-CDMA), "Product Overview," www.spotwave.com, 2003.

(Continued)

*Primary Examiner* — Ricky Ngo
*Assistant Examiner* — Dewanda Samuel

(57) ABSTRACT

Methods and systems for assigning a wireless communication device to a carrier frequency are presented. In an exemplary embodiment, a radio access network (RAN) radiates to define one or more wireless coverage areas using at least two different carrier frequencies. A given wireless communication device (WCD) seeks to engage in a call, and accordingly transmits a probe message to the RAN. In response to receiving the probe message, and based at least on information associated with the probe message, the RAN determines an initial carrier frequency assignment for the given WCD. Preferably, this initial carrier frequency assignment is performed to balance load across at least some of the at least two different carrier frequencies. The RAN then transmits an indication of the carrier frequency assignment to the given WCD. The given WCD may then tune to the assigned carrier frequency and conduct communications using the assigned carrier frequency.

17 Claims, 12 Drawing Sheets

U.S. PATENT DOCUMENTS

| | | |
|---|---|---|
| 6,400,951 B1 | 6/2002 | Vaara |
| 6,404,775 B1 | 6/2002 | Leslie et al. |
| 6,463,298 B1 | 10/2002 | Sorenson et al. |
| 6,477,354 B1 | 11/2002 | Roberts et al. |
| 6,532,221 B1 | 3/2003 | Kim et al. |
| 6,535,736 B1 | 3/2003 | Balogh et al. |
| 6,542,741 B2 | 4/2003 | Wallstedt et al. |
| 6,546,248 B1 | 4/2003 | Jou et al. |
| 6,571,284 B1 | 5/2003 | Suonvieri |
| 6,625,132 B1 | 9/2003 | Boettger et al. |
| 6,658,269 B1 | 12/2003 | Golemon et al. |
| 6,690,915 B1 | 2/2004 | Ito et al. |
| 6,697,603 B1 | 2/2004 | Lovinggood et al. |
| 6,735,432 B1 | 5/2004 | Jarett et al. |
| 6,748,215 B1 | 6/2004 | Chen et al. |
| 6,754,196 B1 | 6/2004 | Daane et al. |
| 6,845,245 B2 | 1/2005 | Hunzinger |
| 6,845,248 B1 | 1/2005 | Johnson |
| 6,993,287 B2 | 1/2006 | O'Neill |
| 7,006,797 B1 | 2/2006 | Sullivan et al. |
| 7,024,217 B2 | 4/2006 | Hunzinger |
| 7,035,587 B1 | 4/2006 | Yarkosky |
| 7,046,964 B1 | 5/2006 | Sullivan et al. |
| 7,177,658 B2 | 2/2007 | Willenegger et al. |
| 7,190,937 B1 | 3/2007 | Sullivan et al. |
| 7,228,134 B2 | 6/2007 | Gandhi et al. |
| 7,299,005 B1 | 11/2007 | Yarkosky et al. |
| 7,302,265 B1 | 11/2007 | Chalishazar et al. |
| 7,400,901 B2 | 7/2008 | Kostic et al. |
| 7,480,485 B1 | 1/2009 | Oh et al. |
| 7,555,295 B2 * | 6/2009 | Qi et al. ............ 455/425 |
| 7,697,928 B2 * | 4/2010 | Shvodian et al. ...... 455/423 |
| 7,773,992 B2 * | 8/2010 | Glazko et al. ......... 455/436 |
| 7,929,490 B1 * | 4/2011 | Srinivas et al. ........ 370/328 |
| 7,933,592 B2 * | 4/2011 | Johnson et al. ........ 455/424 |
| 2001/0011018 A1 * | 8/2001 | Baum et al. ........... 455/439 |
| 2001/0031621 A1 | 10/2001 | Schmutz |
| 2001/0036837 A1 | 11/2001 | Uistola |
| 2002/0044594 A1 | 4/2002 | Bongfeldt |
| 2002/0045431 A1 | 4/2002 | Bongfeldt |
| 2002/0080743 A1 | 6/2002 | Morita et al. |
| 2002/0183039 A1 | 12/2002 | Padgett et al. |
| 2002/0186710 A1 | 12/2002 | Alvesalo et al. |
| 2002/0186749 A1 | 12/2002 | Jones |
| 2003/0031201 A1 * | 2/2003 | Choi .................... 370/468 |
| 2003/0073444 A1 | 4/2003 | Kogiantis et al. |
| 2003/0083069 A1 | 5/2003 | Vadgama |
| 2003/0112821 A1 * | 6/2003 | Cleveland et al. ...... 370/468 |
| 2003/0114103 A1 | 6/2003 | Dinkel et al. |
| 2003/0119505 A1 | 6/2003 | Jou et al. |
| 2003/0176192 A1 | 9/2003 | Morimoto et al. |
| 2003/0224733 A1 | 12/2003 | Schwarz et al. |
| 2004/0005890 A1 | 1/2004 | Holma et al. |
| 2004/0102167 A1 | 5/2004 | Shim et al. |
| 2004/0106408 A1 | 6/2004 | Beasley et al. |
| 2004/0141479 A1 * | 7/2004 | Cha et al. ............... 370/329 |
| 2004/0204097 A1 | 10/2004 | Scheinert et al. |
| 2004/0213182 A1 | 10/2004 | Huh et al. |
| 2004/0214575 A1 * | 10/2004 | Jovanovic ............... 455/444 |
| 2005/0075125 A1 | 4/2005 | Bada et al. |
| 2005/0096053 A1 | 5/2005 | Liu et al. |
| 2005/0148368 A1 | 7/2005 | Scheinert et al. |
| 2005/0164709 A1 | 7/2005 | Balasubramanian et al. |
| 2005/0227619 A1 | 10/2005 | Lee et al. |
| 2006/0013182 A1 | 1/2006 | Balasubramanian et al. |
| 2006/0047842 A1 | 3/2006 | McElwain |
| 2006/0104228 A1 * | 5/2006 | Zhou et al. ............. 370/328 |
| 2006/0142051 A1 | 6/2006 | Purnadi et al. |
| 2006/0160551 A1 | 7/2006 | Matoba et al. |
| 2006/0194553 A1 * | 8/2006 | Ozaki et al. ........... 455/226.1 |
| 2006/0234719 A1 | 10/2006 | Demirhan et al. |
| 2007/0053336 A1 | 3/2007 | Petrovic et al. |
| 2008/0165733 A1 | 7/2008 | Xiao et al. |
| 2009/0191862 A1 | 7/2009 | Amirijoo et al. |
| 2011/0142009 A1 | 6/2011 | Lindoff et al. |

FOREIGN PATENT DOCUMENTS

| | | | |
|---|---|---|---|
| EP | 1463346 | * | 9/2004 |
| WO | WO 98/53621 | | 11/1998 |
| WO | WO 2005/011150 | | 2/2005 |
| WO | 2006/052759 | | 5/2006 |

OTHER PUBLICATIONS

S. Adams, "The Demands on In-Building Solutions—Using smart antennas and adaptive techniques to improve in-building technique," Wireless Business & Technology Magazine, May 20, 2003.

Office Action from U.S. Appl. No. 11/257,661, mailed May 2, 2008.

U.S. Appl. No. 11/535,870, filed Sep. 27, 2006.

Gandhi et al., U.S. Appl. No. 11/073,556, filed Mar. 7, 2005, 37 pages.

Vondemcamp et al., U.S. Appl. No. 11/131,713, filed May 18, 2005, 35 pages.

Down and Lewis, "Dynamic Load Balancing in Parallel Queueing Systems: Stability and Optimal Control," European Journal of Operational Research, vol. 168, Issue 2, pp. 509-519 (Jan. 16, 2006).

* cited by examiner

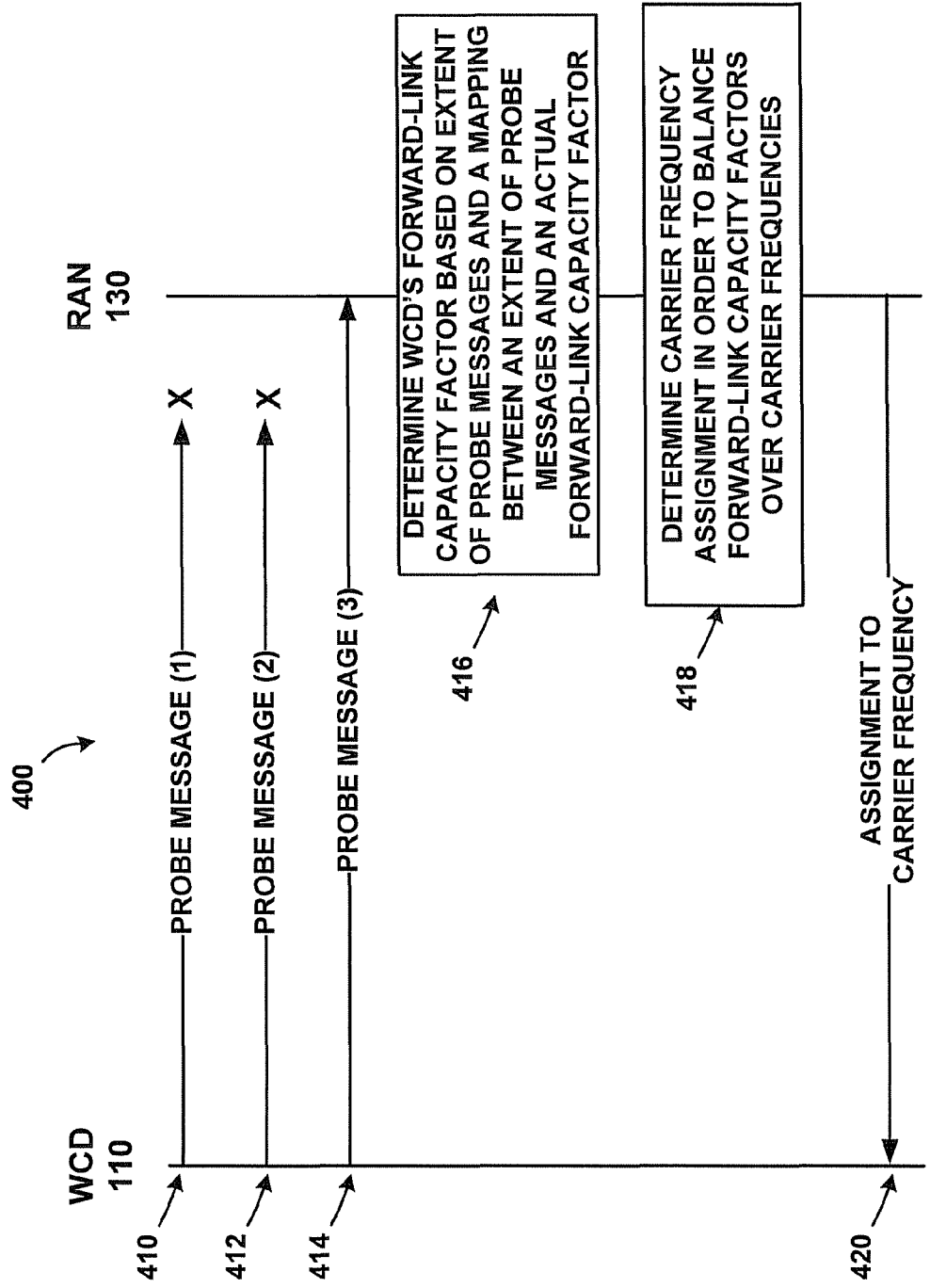

FIG. 4B

| EXTENT OF PROBE MESSAGES | ACTUAL FORWARD-LINK POWER (mW) | | | |
|---|---|---|---|---|
| 1 | 73 | 41 | 53 | 60 |
| 2 | 100 | 172 | 169 | 201 |
| 3 | 102 | 143 | 196 | 215 |
| 4 | 357 | 351 | 234 | 299 |

450

460
462
464
466

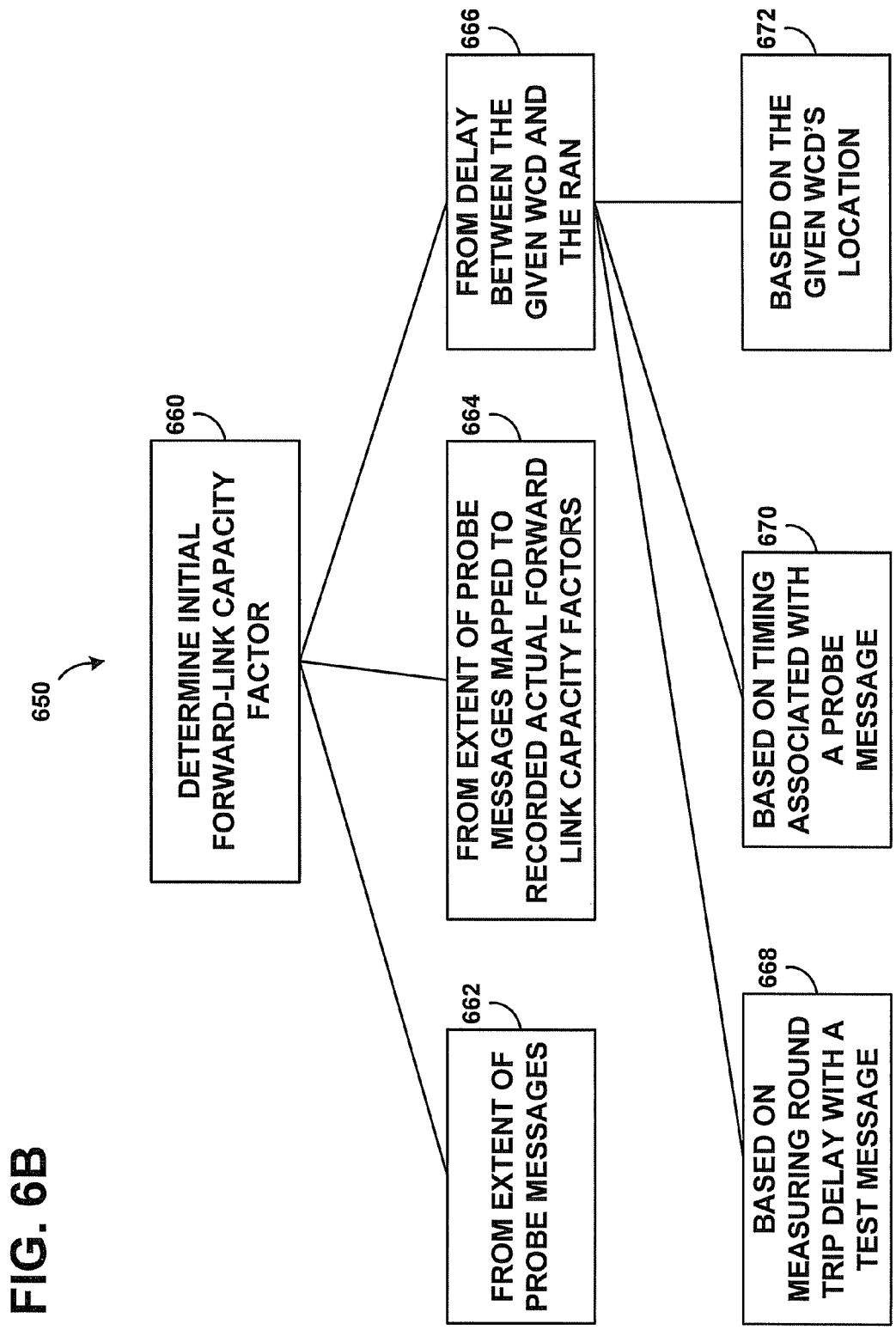

METHODS AND SYSTEMS FOR ASSIGNING A WIRELESS COMMUNICATION DEVICE TO A CARRIER FREQUENCY

BACKGROUND

Wireless communication systems typically comprise one or more radio access networks (RANs) that define one or more wireless coverage areas. Each wireless coverage area may be defined by a RAN radiating on a particular carrier frequency. Furthermore, a single wireless coverage area may serve multiple wireless communication devices (WCDs) through the use of time division multiple access (TDMA) or code division multiple access (CDMA) techniques. Thus, the RAN may facilitate communication between WCDs and other networked entities by providing shared wireless air interface access to the WCDs via the wireless coverage areas.

However, total combined data rate available to all WCDs sharing a particular carrier frequency is limited. Typically, a larger number of WCDs can be supported on the carrier frequency if the WCDs are granted, on average, a lower bit rate. Conversely, if the number of WCDs sharing the carrier frequency is lower, each WCD can be granted, on average, a higher bit rate.

In order to support more WCDs per RAN without necessarily reducing the average bit rate available to these WCDs, the RAN can define multiple spatially overlapping wireless coverage areas, each defined by a different carrier frequency. Through the principle of frequency division multiplexing, so long as each carrier frequency is adequately spaced from adjacent carrier frequencies, WCDs can simultaneously communicate with the RAN on these different carrier frequencies without interference.

However, in order to take advantage of the additional capacity that such a system affords, WCDs should be assigned to these wireless coverage areas in such a way that the overall communication loads across the carrier frequencies are reasonably balanced. One method of doing so is to balance the number of WCDs across the carrier frequencies. However, this method may not always result in efficient utilization of the capacity of the wireless communication system.

OVERVIEW

Methods and devices for assigning WCDS to carrier frequencies are presented. When performing such assignments, these methods and devices may take into account capacity factors other than just the number of WCDs per carrier frequency. In particular, the RAN may consider forward-link capacity factors of the wireless air interface between the RAN and each WCD when performing these assignments. (A forward-link may be the wireless air interface used to transmit from the RAN to a WCD, while a reverse-link may be the wireless air interface used to transmit from the WCD to the RAN.)

Different types of wireless network technologies may use different techniques to control the portion of forward-link capacity available to each WCD assigned to a given carrier frequency. For instance, some CDMA technologies manage the power that the RAN uses to transmit on a forward link to each WCD. Since different WCDs may be different physical distances from the RAN, the RAN may adjust the amount of power that it uses to transmit to each WCD accordingly. Other CDMA technologies may use time-division multiplexing (TDM) to assign various timeslots on a given CDMA channel to various WCDs. Using such a hybrid CDMA/TDM technology, a RAN may transmit at a constant power on the CDMA channel, but dynamically adjust the data rate to each WCD based on feedback from the respective WCD. Other types of wireless technologies, in addition to CDMA may manage forward-link power in a similar fashion.

In both cases, the RAN may base the assignment of a given WCD to a given carrier frequency on an indication of one or more forward-link capacity factors associated with the WCD, as well as capacity factors associated with each available carrier frequency. These capacity factors may be, for instance, forward-link power, forward-link data rate, or other factors.

Thus, in a first embodiment, the RAN may represent a first forward-link capacity it uses in a first wireless coverage area with a first forward-link capacity factor, and the RAN may represent a second forward-link capacity it uses in a second wireless coverage area with a second forward-link capacity factor. The first forward-link capacity is preferably less than the second forward-link capacity. A WCD may request wireless network access from the RAN, for example in order to engage in a voice or data call, by transmitting at least one probe message to the RAN. In response to receiving such a probe message, the RAN may determine an initial forward-link capacity to use when transmitting to the WCD. Thus, the RAN may assign the given WCD to the first carrier frequency based on some combination of factors, including but not limited to: (1) the determined initial forward-link capacity for the WCD, (2) the first forward-link capacity factor, and (3) the second total forward-link capacity factor. In doing so, the RAN may attempt to balance one or more forward-link capacity factors (for instance, forward-link power or forward-link data rate) on the carrier frequencies.

Due to impairments that may be present in wireless networks, the WCD may transmit more than one probe message before the first such probe message is received by the RAN. The RAN may use information contained in the probe message that the RAN receives to estimate the quality of the wireless link between the WCD and the RAN, in order to determine the initial forward-link capacity factor to use when transmitting to the WCD.

For instance, the WCD may include a sequence number in each probe message that the WCD transmits in order to engage in the call. These sequence numbers may begin at a pre-determined value (e.g., zero or one) and may increment, in some fashion, for each subsequent probe message that the WCD transmits. For example, the WCD may transmit a series of probe messages, each with a different, sequentially-increasing sequence number, until the WCD receives some form of acknowledgement from the RAN.

It is expected that when the quality of the wireless network conditions between the WCD and the RAN is high, the WCD may transmit fewer probe messages before the RAN receives one of these probe messages. Conversely, when the quality of the wireless network conditions between the WCD and the RAN is low, the WCD may transmit more probe messages before the RAN receives one of these probe messages. Thus, the information contained in a probe message, such as a sequence number, may be indicative of the wireless network conditions between the WCD and the RAN. Furthermore, this information could be used to estimate an effective initial forward-link power for the WCD, or to estimate an effective forward-link data rate for the WCD. Therefore, upon receiving a probe message, the RAN may estimate such an initial forward-link capacity factor for the WCD based at least on information associated with the probe message.

However, the RAN may use other factors to determine an initial forward-link capacity factor for a WCD. For instance, in response to receiving a probe message, the RAN may determine a round trip delay between the RAN and the WCD, and use this round trip delay to determine the initial forward-link capacity factor.

The forward-link capacity factors associated with WCD may change over time, as the WCD changes its physical location, or as the quality of the forward-link between the BTS and the WCD changes. To take this into account, the RAN may record and store mappings between the (1) number of probe messages transmitted by a WCD in order to engage in a call, and (2) an actual forward-link capacity used by the RAN to transmit to the WCD during the call. From these mappings, the RAN may develop an empirical model of the relationship between these two factors. Then the RAN may use historical data from at least some of these mappings to assign initial forward-link powers to WCDs. In doing so, the RAN may be able to improve the accuracy of such initial forward-link capacity factors, so that less capacity adjustment is needed during calls.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

BRIEF DESCRIPTION OF THE DRAWINGS

FIG. 4A depicts another call flow in accordance with an exemplary embodiment;

FIG. 4B depicts another table in accordance with an exemplary embodiment;

FIG. 6B is a decision tree in accordance with an exemplary embodiment;

DESCRIPTION

In accordance with exemplary embodiments, methods and devices for assigning a WCD to a carrier frequency are presented. A RAN may perform the assignment in response to receiving one or more probe messages from the WCD, where the probe message(s) represent the WCD seeking to engage in a voice or data call.

I. SYSTEM ARCHITECTURE

Figure 1:
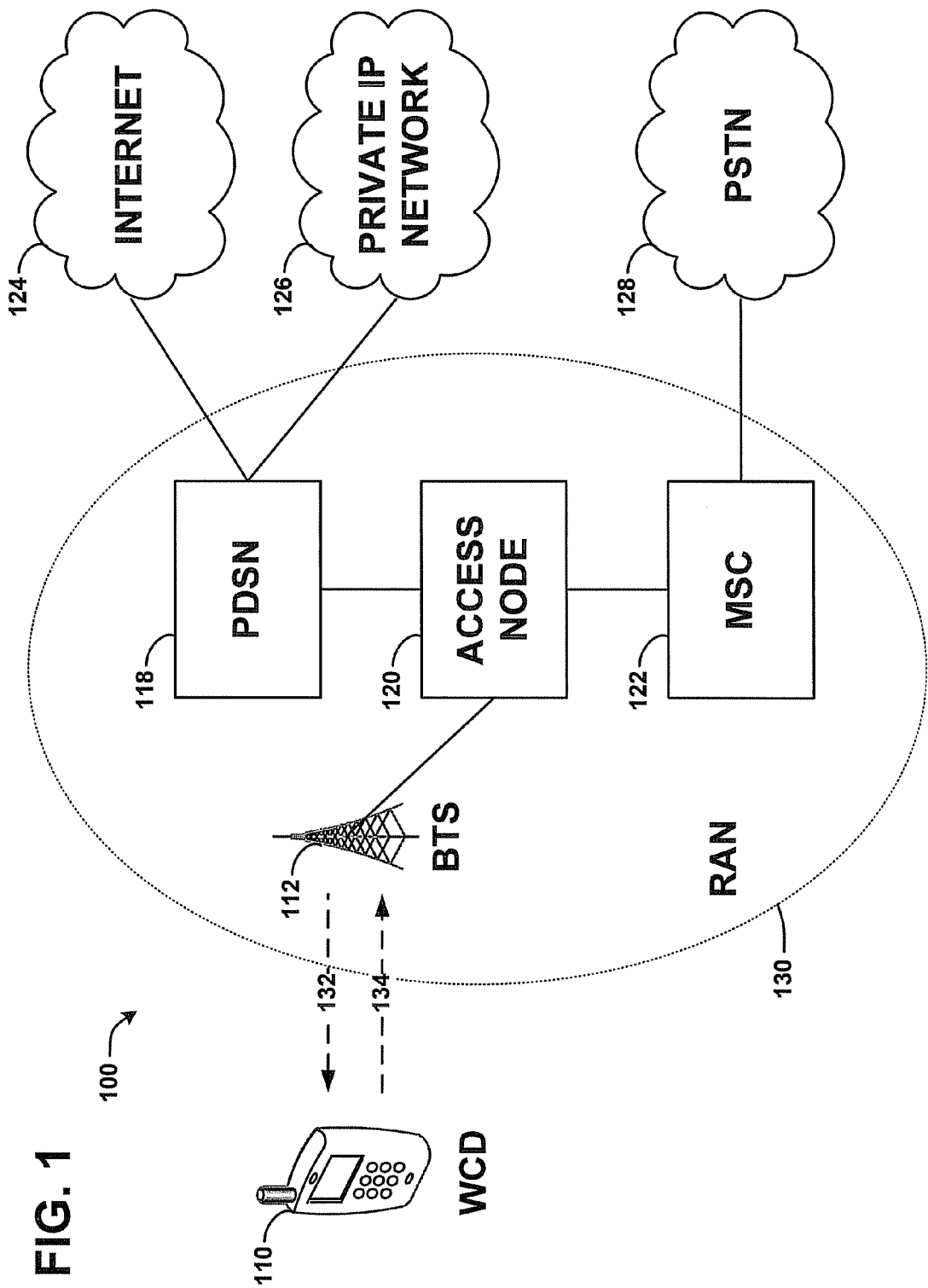
FIG. 1 depicts a wireless communication system in accordance with an exemplary embodiment.

FIG. 1 is a simplified block diagram of an exemplary communication network 100, in which exemplary embodiments may be employed. Network 100 may include base transceiver station (BTS) 112 that can communicate with a WCD 110 via a plurality of wireless coverage areas. WCD 110 could be a wireless telephone, wireless personal digital assistant, wirelessly equipped laptop computer, wireless router, or other type of mobile or fixed wireless device.

BTS 112 radiates to define the wireless coverage areas. Each wireless coverage area may provide air interface access to WCD 110 and any other WCDs served by the wireless coverage area. A single BTS may define one or more wireless coverage areas. The air interface may include a forward-link 132, supporting communication from BTS 112 to WCD 110, and/or a reverse-link 134, supporting communication from WCD 110 to BTS 112. WCD 110 may exchange signaling, voice, data, video, or other media with BTS 112 through the forward and reverse links. In this regard, WCD 110 may use the wireless coverage areas defined by BTS 112 to communicate with one or more endpoints. These endpoints may include other WCDs, e-mail servers, world wide web servers, gaming servers, media servers, media gateways, and/or location-based services. The communication may occur via a packet-switched network (e.g., the Internet 124 or private IP network 126), and/or a circuit-switched network, such as the public switched telephone network (PSTN) 128.

As an illustrative example, BTS 112 may be communicatively coupled to access node 120. Access node 120 may comprise a base station controller (BSC), a radio network controller (RNC), and/or a similar type of device. Access node 120 may, in turn, be communicatively coupled to packet-switched networks 124, 126 via a packet data serving node (PDSN) 118. Alternatively or additionally, access node 120 may be communicatively coupled to PSTN 128 via a mobile switching center (MSC) 122. However, MSC 122 may be integrated with, or replaced by, an IP multimedia subsystem (IMS) infrastructure. Access node 120 may also communicate with PSTN 128 via a media gateway (not shown) that bridges Internet 124 or private IP network 126 to PSTN 128.

Although FIG. 1 shows only one BTS, network 100 may include more than one BTS. Each BTS may be communicatively coupled to access node 120 or to other network elements that are communicatively coupled to packet-switched networks 124, 126 and/or PSTN 128. Furthermore, WCD 110 may be able to transfer ongoing communication sessions from one BTS to another in a handoff process. WCD 110 may also be handed off from between two wireless coverage areas defined by the same BTS. Network 100 may also include multiple access nodes, PDSNs, and MSCs.

The combination of network elements including BTS 112, access node 120, PDSN 118, and MSC 122 may be collectively referred to as a RAN, and these elements are designated as components of RAN 130. However, RAN 130 may also be defined to comprise more or fewer elements. For example, RAN 130 may comprise a single BTS and/or a single access node. Furthermore, these elements may be combined with one another; for example, some combination of a BTS, an access node, a PDSN, and an MSC may be physically co-located or may be logical components of the same physical element.

The entity or entities of RAN 130 preferably include at least one processor, data storage, and program instructions stored in the data storage and executable by the processor to carry out RAN functions described herein. Similarly, a WCD preferably includes at least one processor, data storage, and program instructions stored in the data storage and executable by the processor to carry out WCD functions described herein. Furthermore, the WCDs and RAN 130 may operate and communicate with each other in accordance to various types of wireless protocols, such as Code Division Multiple Access (CDMA), Worldwide Interoperability for Microwave Access (WIMAX®), Universal Mobile Telecommunications System (UMTS), Long Term Evolution (LTE®), IEEE 802.11 (WIFI®), or other protocols.

It should be understood that any communications described herein as being between a WCD and a RAN may take place between a WCD and any component of a RAN. For example, these communications could take place between WCD 110 and access node 120, or between WCD 110 and BTS 112.

Each wireless coverage area defined by BTS 112, or other BTSs not shown, may serve multiple WCDs. Each wireless coverage area defined by a given BTS may be defined on a different carrier frequency, thus enabling the BTS to communicate with a potentially large number of WCDs. Furthermore, neighboring BTSs may define wireless coverage areas with adjacent or overlapping areas of coverage. These adjacent or overlapping wireless coverage areas may be defined using the same carrier frequencies, or different carrier frequencies.

Figure 2A:
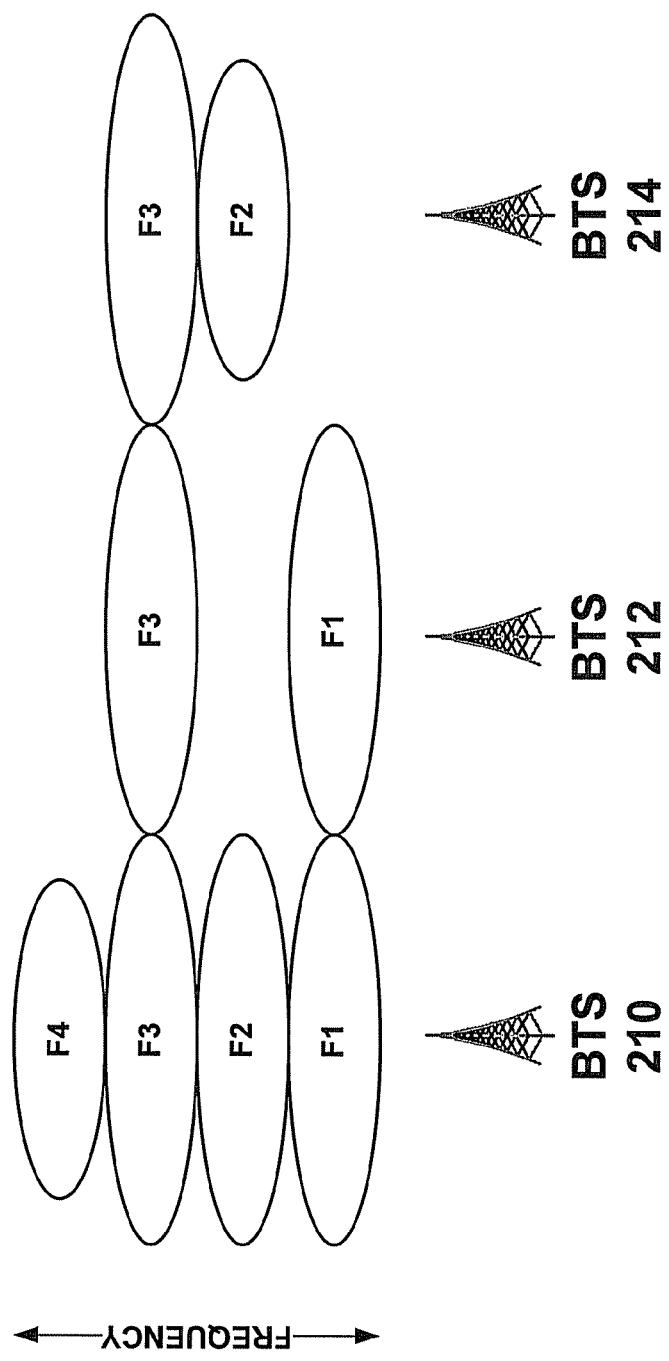
FIG. 2A depicts a number of wireless coverage areas operating at various frequencies in accordance with an exemplary embodiment.

FIG. 2A depicts example wireless coverage areas defined by three BTSs, BTS 210, BTS 212, and BTS 214. BTS 210 defines four wireless coverage areas, one defined using each of carrier frequencies F1, F2, F3, and F4. Preferably, these carrier frequencies are separated by sufficiently large guard bands so that BTS 210 can communicate simultaneously with WCDs on each carrier frequency without substantial intercarrier interference.

BTS 212 defines two wireless coverage areas, one defined using carrier frequency F1 and the other defined using carrier frequency F3. BTS 214 also defines two wireless coverage areas, one defined using carrier frequency F2 and the other defined using carrier frequency F3. As depicted in FIG. 2A, carrier frequency F1 may be a lower frequency than carrier frequency F2, carrier frequency F2 may be a lower frequency than carrier frequency F3, and carrier frequency F3 may be a lower frequency than carrier frequency F4. However, other arrangements are possible without departing from the spirit of the embodiments herein.

BTS 210 and BTS 212 may be physically neighboring one another, and arranged to define at least some wireless coverage areas that provide continuous coverage across the physical locations covered by these BTSs. For example, BTS 210 and BTS 212 both define wireless coverage areas on carrier frequencies F1 and F3. Furthermore, these BTSs define wireless coverage areas using carrier frequencies F1 and F3 so that the wireless coverage areas using these carrier frequencies are adjacent to one another. Thus, a WCD assigned to either carrier frequency F1 or carrier frequency F3 that is handed off from BTS 210 to BTS 212 (or vice versa), can continue communicating on the same carrier frequency after it is handed off.

Generally speaking, when a WCD is handed off from a first BTS to a second BTS while the WCD is engaged in a call, it is possible for the WCD's call to be dropped. However, it is more likely that the WCD's call is dropped when the WCD is assigned to a different carrier frequency by the second BTS, than if the WCD is assigned to the same carrier frequency by the second BTS. Accordingly, wireless network operators may seek to arrange their wireless networks to provide multiple physically adjacent wireless coverage areas on certain carrier frequencies. For instance, in FIG. 2A, BTS 210, BTS 212, and BTS 214 all define wireless coverage areas on carrier frequency F3. These wireless coverage areas are adjacent, thus facilitating broad wireless coverage. Therefore, a WCD may be handed off from BTS 210 to BTS 212 and then from BTS 212 to BTS 214, with a relatively low probability of suffering a dropped call during these handoffs.

It should be understood that each wireless coverage area defined by a given BTS may be of a different size and/or shape. For instance, as depicted in FIG. 2A, the wireless coverage area defined by BTS 210 on carrier frequency F4 may be smaller than the other wireless coverage areas defined by BTS 210. Similarly, the wireless coverage area defined by BTS 214 on carrier frequency F2 may be smaller than the wireless coverage area defined by BTS 214 on carrier frequency F3.

A wireless network operator may determine the number of wireless coverage areas for a given BTS based on the wireless network traffic expected or observed near the given BTS. Generally speaking, BTSs located in or near a physical location with a high population density may be arranged to define a relatively large number of wireless coverage areas, while BTSs located in or near a physical location with a low population density may define a relatively small number of wireless coverage areas. Thus, for instance, BTS 210 may be in a densely populated area exhibiting a large number of WCDs that generate a large amount of total wireless network traffic, because it defines four wireless coverage areas. However, BTS 212 and BTS 214 may be in less densely populated areas where fewer WCDs generate less total wireless network traffic, because each of these BTSs only define two wireless coverage areas.

II. POWER CONTROL AND RATE CONTROL IN WIRELESS NETWORKS

Depending on the type of wireless network technology employed by a RAN, the RAN may user power control or rate control to associate a forward-link capacity factor (power and data rate, respectively) with a WCD. In this section, power control and rate control are described, and example embodiments of each are provided.

A. Power Control

Some wireless network technologies, such as CDMA 1xRTT and UMTS, utilize dynamic power control on forward links between the RAN and a WCD. In doing so, these technologies may seek to adapt to changing wireless air interface conditions on these forward links.

When a RAN assigns a WCD to a wireless coverage area, the RAN may also assign the WCD an initial forward-link power. The RAN may then use this initial forward link power when transmitting to the WCD. A WCD that is physically distant from the RAN, or subject to impairments on the wireless network between it and the RAN, may require more forward-link power than a WCD that is in a closer physical proximity to the RAN or subject to fewer impairments on the wireless air interface. The initial forward-link power assignment to a WCD may be pre-determined, arbitrary, or may take the form of an estimate of the actual forward-link power that the WCD is likely to require.

Once the RAN assigns an initial forward-link power to the WCD, the WCD may transmit power-control messages to the RAN, requesting that the RAN adjust this forward-link power. These messages may be transmitted at given rate. (For example, in some CDMA networks, WCDs may transmit 800 power-control messages per second). Each power-control command may be a "power-up" command to increment forward-link power to the WCD, or a "power-down" command to decrement forward-link power to the WCD.

The amount that forward-link power may be incremented or decremented per power-control message may be specified as an absolute amount of power, or as a fraction of a current forward-link power. In this way, a RAN can dynamically adjust the forward-link power it uses for a WCD as the WCD moves about a wireless coverage area and/or as the WCD's wireless network coverage quality changes.

Typically, a WCD determines that it should request that the RAN adjust forward-link power used to transmit to the WCD by measuring a call characteristic of the forward-link. For example, if the WCD observes a high bit error rate (BER) or frame error rate (FER) on the forward-link, the WCD may transmit a power-up command to the RAN. On the other hand, if the WCD observes a lower BER or FER on the forward link, the WCD may transmit a power-down message to the RAN. The BER of a link may be the ratio of the number of bits erroneously received to the total number of bits received. Similarly, the FER of a link may be the ratio of the number of frames erroneously received to the total number of frames received. For the forward links and reverse links discussed herein, each type of link may exhibit a different BER and/or FER. Note that increasing the RAN's forward-link power to the WCD does not guarantee that the error rates experienced by the WCD are decreased, but it may increase the likelihood that these error rates are decreased. However, even if the RAN is transmitting to a WCD with a relatively high forward-link power, the effective forward-link data rate to the WCD may be relatively low.

In practice, the forward-link power level on the air interface may be specified as a gain level, x, according to the relationship x dBm=10 log 10(P/1 mW), where P is the power in milliwatts (mW), and each power increment amount or power decrement amount is specified to be 1 dB with respect to the current power level (although other quantities of dBs could be used). As such, the RAN may increase power on a forward link to a given WCD by 1 dB for each power-up command that the RAN receives from that WCD, and may decrease transmission power on the forward link by 1 dB for each power-down command that it receives from the WCD. Note that a 3 dB change (up or down) corresponds to a factor of two change in absolute forward-link power (increase or decrease, respectively).

Figure 2B:
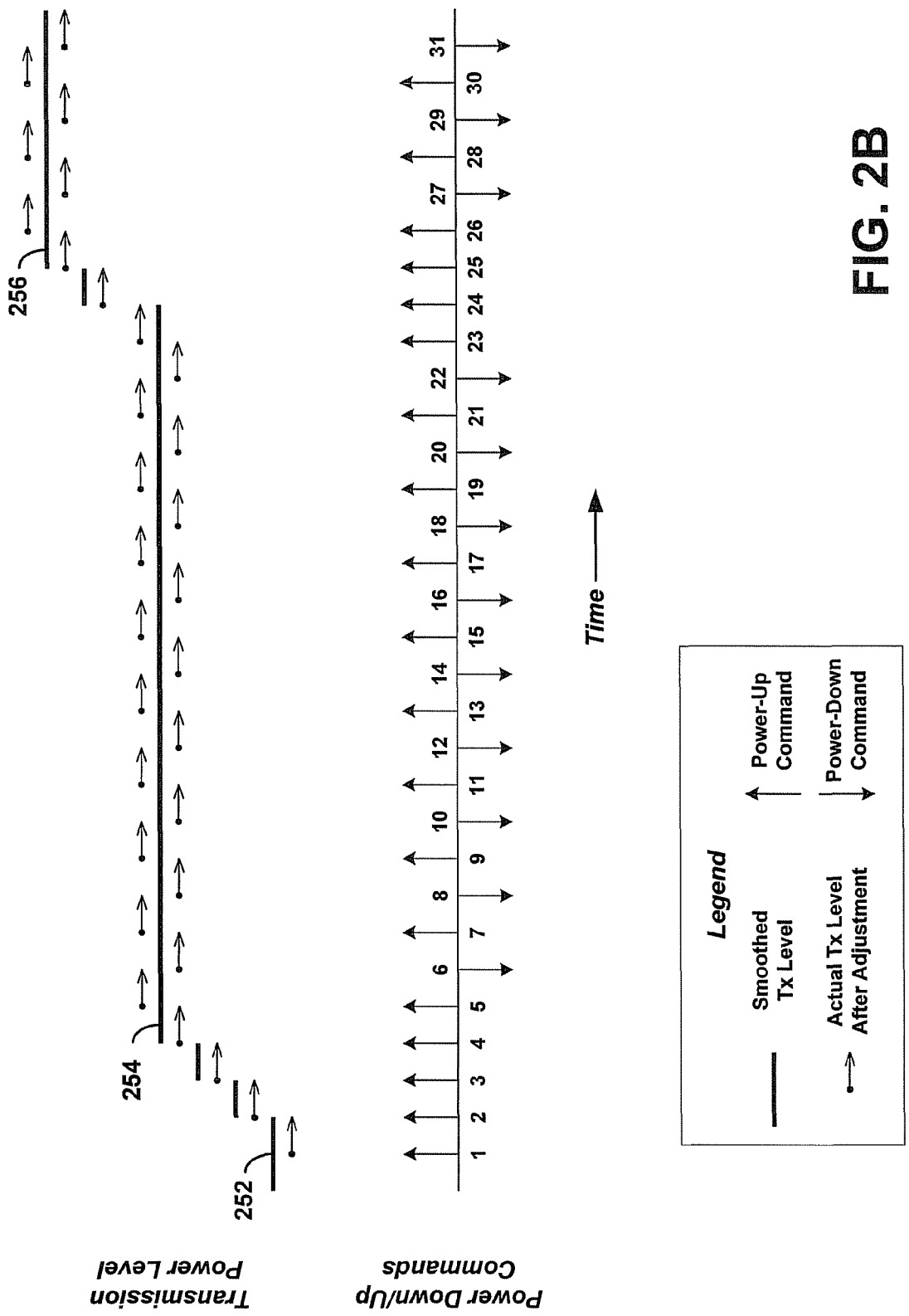
FIG. 2B depicts variations in forward-link power in a wireless communication network in accordance with an exemplary embodiment.

FIG. 2B depicts example operation of forward-link power control as a function of time for sequences of power-up and power-down commands. Example actual forward-link power levels resulting from power adjustments are shown in the top panel of FIG. 2B. The power-control commands received by the RAN are shown in the bottom panel of FIG. 2B. As indicated, time increases towards the right in the figure. For the purpose of describing the process from the point of view of a RAN, the forward-link power levels shown in FIG. 2B are taken to correspond to transmission power levels on the RAN's air interface that may achieve the required threshold level at the receiving entity, and are preferably not the received power at the WCD.

As indicated in the legend in FIG. 2B, the actual transmission power levels in the top panel are represented by right-directed arrows ("Actual Tx Level After Adjustment" in the legend) and a smoothed representation of these power levels is represented by thick horizontal lines ("Smoothed Tx Level" in the legend). Also as indicated in the legend, power-up commands are represented by upward-directed arrows, while power-down commands are represented by downward-directed arrows. A number below each power-up command and above each power-down command in the bottom panel corresponds to the order of transmission of the command at the sending entity, and provides a label for the convenience of the discussion herein. The time position of each command in the bottom panel represents the arrival time at the RAN. By way of example, the adjustment made in response to each power-up command is taken to be 1 dB up, and the adjustment made in response to each power-down command is taken to be 1 dB down. However, other amounts of adjustment could be made in response to the commands.

Three example steady-state forward-link power levels, 252, 254, and 256, are depicted in FIG. 2B. An initial forward-link power is represented by forward-link power level 252. The WCD may determine that this initial forward-link power is too low, and transmit is series of power-up commands #1-#5. This results in increasing the forward-link power to forward-link power level 254. Forward-link power level 254 persists to approximately power-control command #23, and then jumps to forward-link power level 256. Between power-control commands #5 and #23, the forward-link power to the WCD is substantially stable, and is maintained through a sequence of alternating power-up and power-down commands. Similarly, between power-control commands #26 and #31, the forward-link power to the WCD is also substantially stable.

For purposes of example, actual forward-link power assigned to WCDs in some CDMA systems may range from 40 mW to 1000 mW, and may take on an average value of 150 mW. However, CDMA systems, as well as other types of wireless communication systems, may use different ranges and average values of forward-link power. For instance, pico-cellular systems that are intended to define small, in-building wireless coverage areas may transmit with less forward-link power than wide-area cellular systems.

The forward-link power associated with a WCD may serve as a proxy for an effective data rate available from the RAN to the WCD. For instance, if the RAN is transmitting with a very high forward-link power to a WCD, it is likely that the WCD is experiencing poor wireless coverage quality. Thus, the effective data rate from the RAN to the WCD may be substantially lower than the actual forward-link capacity used by the RAN. In other words, the RAN transmitting to the WCD in such a situation may be an example of a relatively inefficient use of forward-link capacity.

B. Data Rate Control

Some wireless network technologies, such as CDMA Evolution—Data Only (EVDO), utilize dynamic data rate control on forward links from the RAN to a WCD. Similar to the goals of technologies that use dynamic power control, these technologies may seek to adapt to changing wireless air interface conditions on forward links. CDMA EVDO technologies, for example, use TDM on forward links. Thus, systems employing these technologies may transmit at a constant power on these forward links, but adjust the number of bits used per timeslot based on an error rate associated with the WCD assigned to the timeslot.

Accordingly, in such a system, a WCD may, from time to time, measure the quality of its wireless coverage. For example, the WCD may calculate the signal-to-noise ratio of a forward-link channel, such as a pilot channel, as the received pilot channel energy (denoted Ec) to the total received energy (denoted Io). The result, Ec/Io, is expressed in decibels (dB), and typically falls within the range of 0.0 dB (excellent wireless coverage) to (−16.0 dB) very poor wireless coverage. However, Ec/Io values less than −16.0 are possible. Alternatively, Ec/Io may be referred to as C/I, the carrier-to-interference ratio of the forward direction channel. Furthermore, other methods of measuring a forward-link channel's signal-to-noise ratio may be used.

Once Ec/Io, or another estimate of wireless coverage quality, is determined, the WCD may transmit this estimate to the RAN (for example, in a pilot strength measurement message (PSMM) or a resource utilization message (RUM)), or the WCD may use the estimate to recommend to the RAN a forward-link data rate that the WCD may be able to receive. Typically, a WCD will attempt to recommend the highest forward-link data rate that the WCD estimates it can receive such that its received frame error rate is reasonably low (e.g., less than 3%). The WCD may transmit this information to the RAN on a data rate control (DRC) channel in the form of an integer. Exemplary DRC values are shown in Table 1.

TABLE 1

Exemplary DRC values and associated data rates.

| DRC Value | Data rate (kilobits per second) |
|---|---|
| 1 | 38.4 |
| 2 | 76.8 |
| 3 | 153.6 |
| 4/5 | 307.2 |
| 6/7 | 614.4 |
| 8 | 921.6 |
| 9/10 | 1228.8 |
| 11 | 1843.2 |
| 12 | 2457.6 |
| 13 | 1536 |
| 14 | 3072 |

The WCD may transmit a DRC value to the RAN periodically, according to a static or dynamic schedule, randomly, or in response to a trigger that is internal or external to the WCD. Upon receiving a DRC value from a WCD, the RAN may select the data rate associated with the DRC value. Alternatively, the RAN may select a higher or lower data rate based on RAN configuration or policy. During the period in which forward-link timeslots are allocated to a WCD, the WCD may continue transmitting DRC values to the RAN and the RAN may responsively adjust the data rate of the forward link.

Typically, for each slot on such a forward link, the RAN modulates the forward link's physical signal to represent a number of bits. When a WCD is subject to a high error rate, it may be able to reduce this error rate by requesting that the RAN transmit at a lower data rate. The lower data rate would mean that there are fewer bits in each timeslot, and therefore the WCD has a greater opportunity to resolve and properly receive each bit, generally resulting in a lower error rate on the forward link. Accordingly, when the WCD transmits a high DRC value to the RAN, the RAN may place more bits in a timeslot. But when the WCD transmits a low DRC value to the RAN, the RAN may place fewer bits into a timeslot. Thus, the effective data rate of WCDs subject to poor wireless coverage may be relatively low, and the RAN's forward-link capacity may be used inefficiently when serving these WCDs.

III. EXEMPLARY CALL FLOWS

Figure 3A:
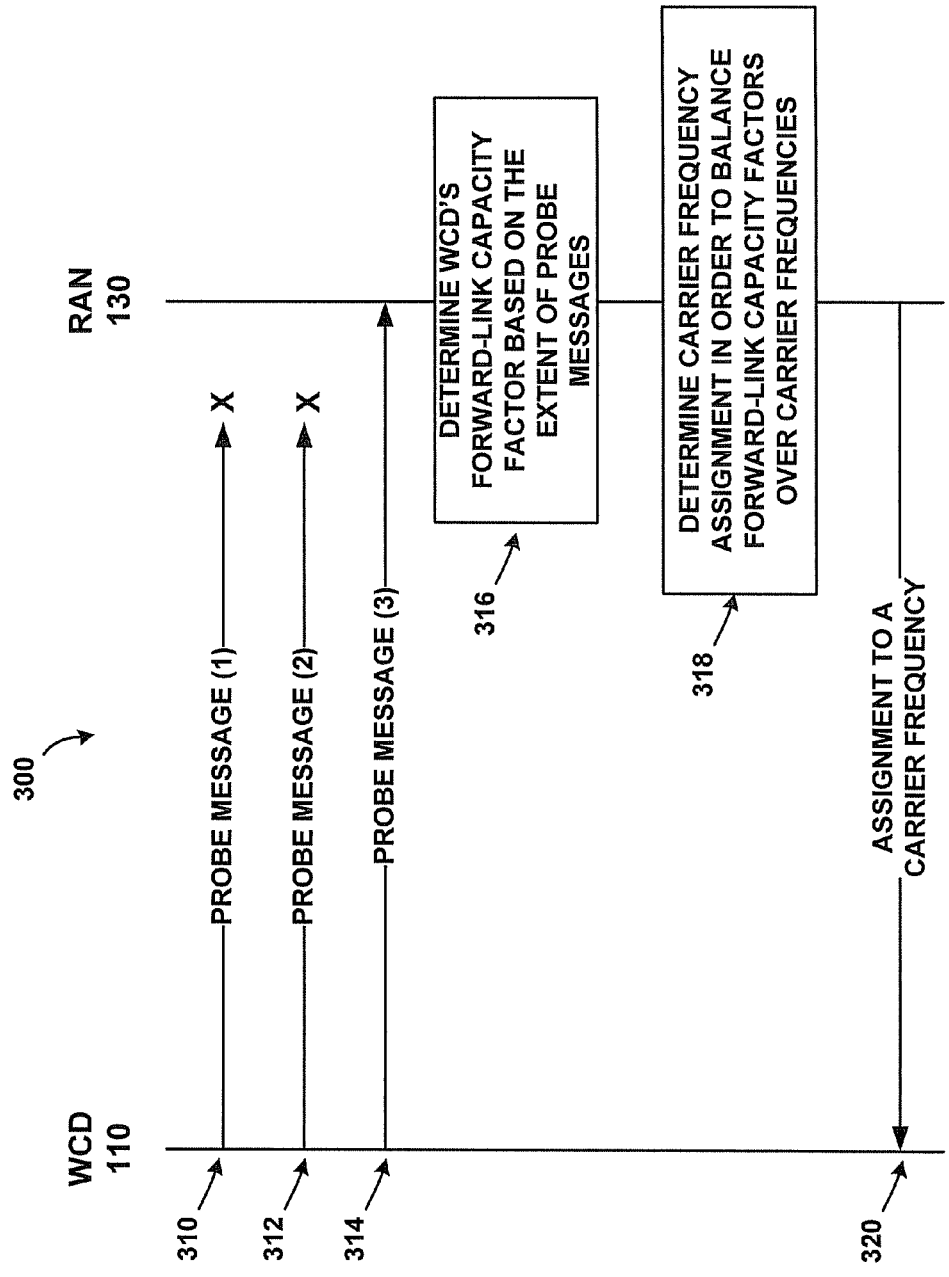
FIG. 3A depicts a call flow in accordance with an exemplary embodiment.
Figure 5:
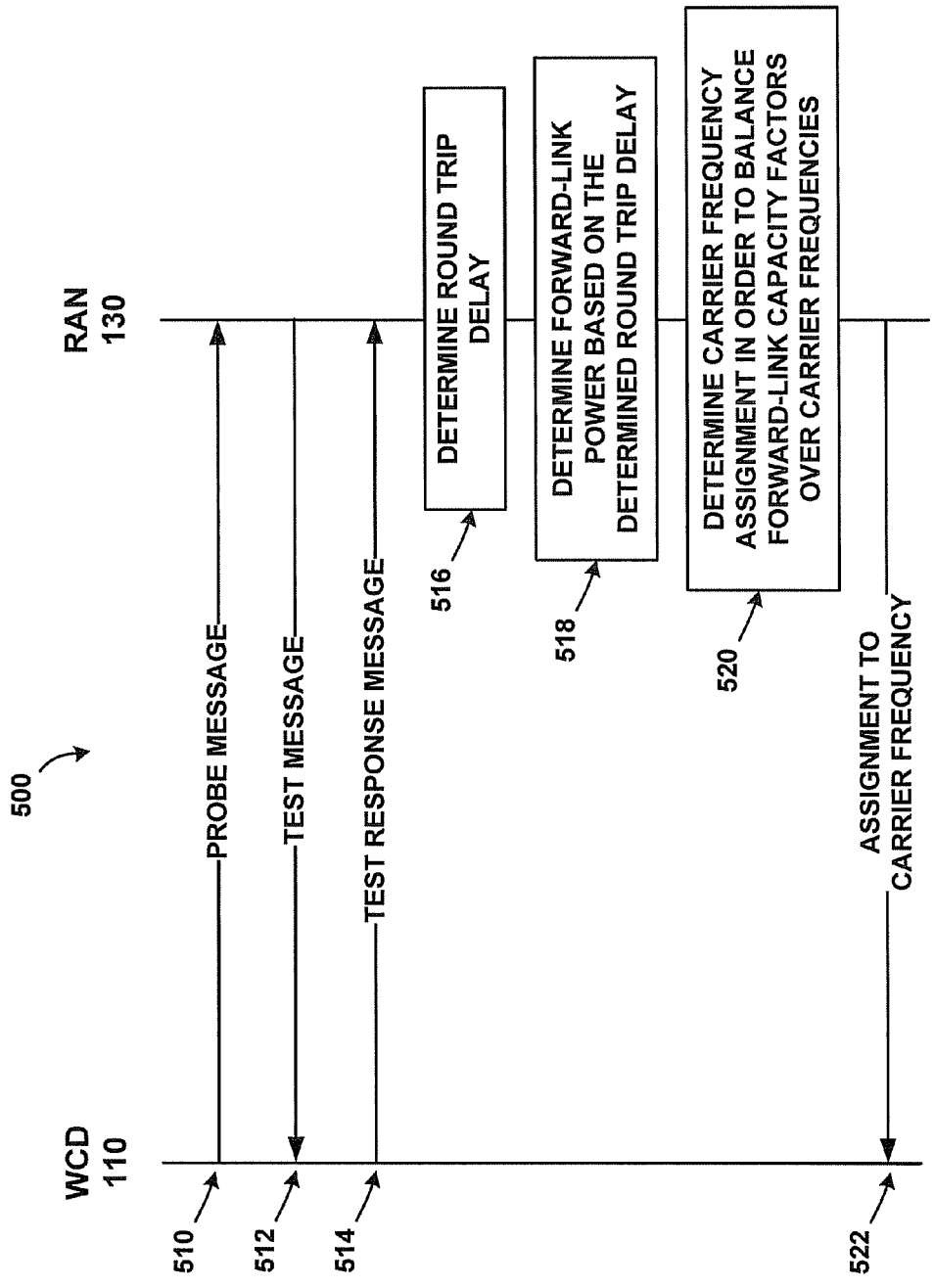
FIG. 5 depicts yet another call flow in accordance with an exemplary embodiment.

FIGS. 3A, 4A, and 5 are call flows depicting methods and devices in accordance with exemplary embodiments. In these call flows, the WCD may begin in an idle state. In such a state, the WCD may not be assigned forward-link or reverse-link bearer channels, and therefore may not be transmitting or receiving bearer traffic. However, even when a WCD is in an idle state, the WCD may be communicating with the RAN through signaling channels. These signaling channels may include paging channels, access channels, power control channels, pilot channels, synch channels, as well as other types of channels.

As the WCD seeks to engage in a call, the WCD may transmit one or more probe messages to the RAN in order to acquire an assignment of forward-link and/or reverse-link channels. The call may be either a voice or data call, and the call may be originated by the WCD (i.e., the WCD is the caller), or received by the WCD (i.e., the WCD is the callee).

With respect to when the WCD is the caller, the WCD may determine that it should acquire forward-link and/or reverse-link channels to engage in the call. For instance, if the call is a voice call, the user of the WCD may have dialed a phone number and pressed a "talk" button. Responsively, the WCD may transmit the series of probe messages in order to acquire the appropriate forward-link and/or reverse-link channels to support the voice call. In this case, the probe messages may take the form of origination messages.

On the other hand, if the WCD is the callee, the WCD may receive a page-request message from the RAN, indicating that there may be an incoming call for the WCD. Upon receiving the page-request message, the WCD may determine that it should acquire forward-link and/or reverse-link channels to engage in the call. Accordingly, the WCD may transmit the series of probe messages to the RAN. In this case, the probe messages may take the form of page-response messages.

Note that for data sessions, as opposed to voice calls, the WCD may enter the idle state one or more times during the duration of the session. Thus, for data sessions, a "call" may be an individual instance of the WCD acquiring and using one or more forward-link and/or reverse link channels to transmit or receive data. Therefore, a data session may consist of one or more "calls."

Regardless of the form of the probe messages and the type of the call, each probe message may contain an indication of how many probe messages have been transmitted by the WCD in order to engage in the call. For instance, the first probe message may contain an indication of the number "one," the second probe message may contain an indication of the number "two," and so on. Of course, the probe messages may contain other indications of how many probe messages have been transmitted by the WCD in order to engage in the call. Thus, upon receiving a probe message from a WCD, the RAN can read this indication from a given probe message in order to determine how many attempts the WCD may have made to transmit probe messages before the given probe message was successfully received by the RAN. In turn, the RAN may use the information in the given probe message to help it determine one or more initial forward-link capacity factors for the WCD. These capacity factors may represent a forward-link power, a forward-link data rate, and/or some other forward-link characteristic.

This process is illustrated in call flow 300 of FIG. 3A. At step 310, WCD 110 transmits a first probe message to RAN 130. Accordingly, the first probe message may contain an indication of the number "one." However, this first probe message never reaches RAN 130, or RAN 130 otherwise fails to receive the first probe message. Consequently, WCD 110 does not receive an acknowledgment for the first probe message, such as an assignment to a carrier frequency. Thus, WCD 110 may time out, and at step 312, transmit a second probe message, containing an indication of the number "two," to RAN 130. This second probe message is also not received by RAN 130. At step 314, WCD 110 transmits a third probe message, containing an indication of the number "three," to RAN 130. This time, RAN 130 successfully receives the third probe message.

RAN 130 may determine, from information contained in the third probe message, an initial forward-link capacity factor for WCD 110. This capacity factor may be, for example, a representation of a forward-link power associated with the WCD or a forward-link data rate associated with the WCD.

RAN 130 may do so by reading the indication of the number "three" from the third probe message in order to determine that three probe messages were transmitted by WCD 110 before any were received by RAN 130. Then, at step 316, RAN 130 may determine an initial forward-link capacity factor based on the extent of these indications.

Figure 3B:
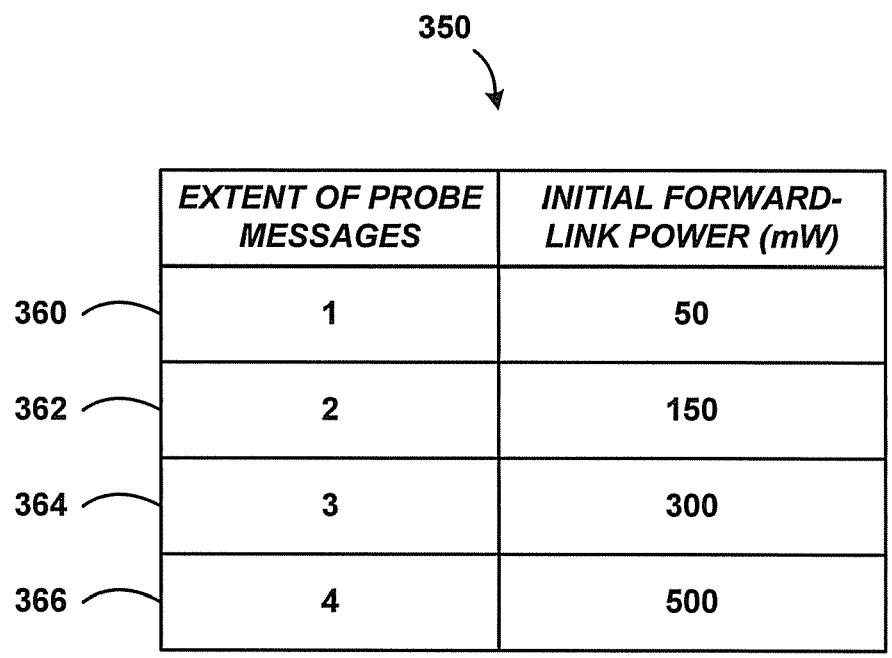
FIG. 3B depicts a table in accordance with an exemplary embodiment.

For instance, such a forward-link capacity factor may be a forward-link power. Accordingly, RAN 130 may contain a static mapping between an extent of probe messages received from a WCD and an initial forward-link power to assign to the WCD. RAN 130 may use such a static mapping to determine the initial forward-link power to assign to the WCD. Turning momentarily to FIG. 3B, exemplary table 350 provides mappings of extents of probe messages to initial forward link powers. For example, if RAN 130 successfully receives the first probe message from a WCD, then mapping 360 indicates that RAN 130 should use an initial forward-link power of 50 mW. Likewise, if RAN 130 successfully receives the second probe message from a WCD, then mapping 362 indicates that RAN 130 should use an initial forward-link power of 150 mW. Mappings 364 and 366 provide similar information for when RAN 130 receives the third and fourth probe messages, respectively.

Note that, in FIG. 3B, as the extent of probe messages increases, so does the initial forward-link power. This reflects the understanding that the more probe messages the WCD transmits in order to engage in a call, the more likely the WCD is physically distant from the RAN or subject to wireless impairments. Consequently, the WCD will more likely require a greater forward-link power. However, other relationships between extents of probe messages and initial forward-link powers are possible.

Furthermore, exemplary table 350 may contain more than just four entries. For instance, table 350 may also contain entries for extents of five, six, seven, or more, probe messages. Moreover, the values of initial forward-link power may be different than those appearing in exemplary table 350. Moreover, these values need not be static; instead, they can be updated from time to time.

A table, such as exemplary table 350, may be stored within a component in a RAN (such as a BTS or an access node). Additionally, a separate table may be configurable for each wireless coverage area. This would provide the ability for an operator of the RAN to configure different mappings for different BTSs, access nodes, and/or wireless coverage areas. Such a feature may be desirable, for instance, if a first BTS is in a physical location with few obstructions and/or interference to wireless signals, but a second BTS of the same RAN is in a physical location with significant obstructions and/or interference to wireless signals. Thus, an operator of the RAN would be able to configure the RAN to select lower initial forward-link powers for the first BTS than the second BTS, because it would be expected that the first BTS could transmit at a lower forward-link power for its WCDs to successfully receive information on the forward link.

Moreover, the capacity factor may be a forward-link data rate instead of (or in addition to) a forward-link power. When capacity factor is a forward-link data rate, a table similar to table 350 may be used, except that entries representing forward-link data rates may be present. Thus, for instance, an extent of one probe message may be associated with a data rate of 2457.6 kilobits per second, an extent of two probe messages may be associated with a data rate of 1228.8 kilobits per second, and so on. Alternatively, the table may associate an extent of probe messages with a DRC value, or some other representation of forward-link data rate.

Turning back to FIG. 3A, at step 318, RAN 130 determines a carrier frequency assignment for WCD 110 in order to balance forward-link capacity factors over carrier frequencies. Thus, if RAN 130 has the option of assigning WCD 110 to one of three available carrier frequencies, RAN 130 may select the carrier frequency with the lowest current utilized forward-link capacity. Alternatively, RAN 130 may take multiple aspects of wireless network performance into consideration, where load balancing is just one of these aspects.

For example, as illustrated in FIG. 2A, a RAN may support multiple adjacent wireless coverage areas on the same frequency. As described above, dropped calls on handoff may be reduced when a WCD is handed off between two wireless coverage areas using the same carrier frequency. Thus, if the WCD is served by, for example, BTS 210 of FIG. 2A, the RAN may prefer to assign the WCD to carrier frequency F3, because all three BTSs support wireless coverage areas using this carrier frequency. Therefore, the RAN may "front-load" carrier frequency F3 by assigning a disproportionate number of WCDs to this carrier frequency before engaging in more equitable capacity-factor-based load balancing across all carrier frequencies.

Regardless of the exact means through which RAN 130 arrives at a carrier frequency assignment, at step 320, RAN 130 transmits a carrier frequency assignment to WCD 110. This transmission may take the form of a traffic channel assignment message. Accordingly, WCD 110 may tune its transceiver(s) to the assigned carrier frequency so that WCD 110 can communicate bearer traffic on forward-link and/or reverse-link channels.

As described above, the amount of forward-link power or the effective data rate that a RAN uses to communicate with a WCD may vary over time during the lifetime of a call. Thus, it may be advantageous for the RAN to record an actual forward-link capacity factor used at some point during the lifetime of the call, and to use one or more of these recorded actual forward-link capacity factors to determine, at least in part, an appropriate initial forward-link capacity factor for a subsequent call. For instance, 20 seconds into each call, the RAN may record the actual forward-link power or actual effective data rate of the call, as well as the number of probe messages transmitted by the WCD to establish the call. As the RAN compiles a larger and larger database of such information, the RAN will be able to more accurately relate actual forward-link capacity factors with an associated number of probe messages.

FIG. 4A is a call flow 400 that illustrates a method directed to that end. At step 410, WCD 110 transmits a first probe message to RAN 130. Similar to the scenario illustrated in call flow 300, this first probe message never reaches RAN 130, or RAN 130 otherwise fails to receive the first probe message. Consequently, WCD may time out, and at step 412, transmit a second probe message to RAN 130. This second probe message is also not received by RAN 130. At step 414, WCD transmits a third probe message to RAN 130. This time, RAN 130 successfully receives the third probe message. As in call flow 300, the first, second, and third probe messages may contain indications of their "numbers" one, two, and three, respectively.

At step 416, RAN 130 may determine, from the extent of probe messages and a mapping between extents of probe messages and actual forward-link capacity factors, an initial forward-link capacity factor for WCD 110. RAN 130 may do so by reading the indication of the number "three" from the third probe message in order to determine that three probe messages were transmitted by WCD 110 before any were received by RAN 130. Then, RAN 130 may consult a table of mappings between extents of probe messages and recorded actual forward-link capacity factors in order to determine an appropriate initial forward-link capacity factor. For instance, such a capacity factor may be a forward-link power or a forward-link data rate.

Turning momentarily to FIG. 4B, exemplary table 450 provides mappings of extents of probe messages to recorded actual forward-link powers. Thus, entry 460 of exemplary table 450 indicates that, when RAN 130 received the first probe message for four actual calls, it used actual forward-link powers of 73 mW, 41 mW, 53 mW, and 60 mW, respectively. Similarly, entry 462 of exemplary table 450 indicates that, for four additional calls, RAN 130 received the second probe message, and then used actual forward-link powers of 100 mW, 172 mW, 169 mW, and 201 mW, respectively. The same logic may apply for entries 464 and 466.

Thus, exemplary table 450 provides a means with which RAN 130 can determine an initial forward-link power based on empirical data from previous calls with WCDs. RAN 130 may choose an initial forward-link power from one of the actual forward-link powers in exemplary table 450, or RAN 130 may perform a calculation based on these actual forward-link powers to determine an initial forward-link power. Thus, for a given WCD that transmits a given extent of probe messages, RAN 130 may calculate an average forward-link power from exemplary table 450, and then assign this average forward-link power to the given WCD. RAN 130 may alternatively calculate the average based on the n most recently observed actual forward-link powers, or RAN 130 may calculate a weighted average or an autoregressive value based on the actual forward-link powers appearing in exemplary table 450.

If the forward-link capacity factor is a forward-link data rate, then the RAN alternatively or additionally may have access to a similar table that associates extents of probe messages with actual forward-link data rates. The RAN may access such a table in order to determine a carrier frequency assignment for a WCD.

FIG. 5A is a call flow that depicts another method 500 for determining a forward link capacity factor for a WCD. At step 510, WCD 110 transmits a probe message to RAN 130. Preferably, this probe message indicates that WCD 110 is seeking to engage in a call. At step 512, in response to receiving the probe message, RAN 130 transmits a test message to WCD 110. Preferably, RAN 130 transmits this test message on a signaling channel, such as a paging channel. At step 514, upon receiving the test message, WCD 110 may transmit a test response message to RAN 130.

As an example of test message format and operation, the test message may contain an identifier, such as a sequence number, and may also contain a timestamp. The timestamp preferably indicates the time at which RAN 130 transmitted the test message. At step 514, WCD 110 may copy the identifier and timestamp (if the latter is present in the test message) from the test message into the test response message. In this way, RAN 130 may, after receiving the test response message, determine the round-trip delay between itself and WCD 110. Alternatively, if RAN 130 does not include a timestamp in the test message, RAN 130 can still determine the round-trip delay between itself and WCD 110. For example, RAN 130 may store a first timestamp in its memory such that the first timestamp is associated with the identifier of the test message. After receiving the test response message, RAN 130 may record a second timestamp that indicates the time at which RAN 130 received the test response message. Then, RAN 130 may retrieve the timestamp from memory and determine the round-trip delay between itself and WCD 110 by subtracting the first timestamp from the second timestamp.

Regardless of the implementation details, at step 516, RAN 130 may determine such a round-trip delay. At step 518, RAN 130 may determine a forward-link capacity factor to assign to WCD 110 based on this determined round-trip delay. For instance, this round-trip delay may be indicative of a physical distance between WCD 110 and RAN 130 (e.g., the larger the round-trip delay, the larger this physical distance). RAN 130 may determine a higher forward-link power, or a lower forward-link data rate, when it is more physically distant from a WCD, since attenuation and other impairments on the forward-link are likely to increase with distance.

Thus, at step 520, RAN 130 determines a carrier frequency assignment for WCD 110 so that forward-link capacity factors over the carrier frequencies supported by RAN 130 are reasonably balanced. Accordingly, at step 522, RAN 130 transmits an indication of the carrier frequency assignment to WCD 110.

In addition to basing the determined forward-link capacity factor on an extent of probe messages, actual forward-link capacity factors, and round-trip delays, a RAN may also use other means to determine an initial forward-link capacity factor for a given WCD. For instance, the given WCD might transmit a representation of its location, such as its global positioning system (GPS) coordinates, to the RAN, either in a probe message or in some other message. The RAN may then determine the physical distance between itself and the WCD by comparing its own coordinates to the WCD's coordinates. Based at least in part on this determined physical distance, the RAN may further determine an initial forward-link capacity factor.

In another embodiment, the RAN may determine a unidirectional delay from a WCD to the RAN. Some wireless communication systems, such as certain types of CDMA systems, exhibit a high degree of message synchronization. This means that a RAN may expect that a given WCD would transmit a particular message, such as a probe message, at a particular time. Upon receiving such a message, the RAN may determine the unidirectional delay between itself and the given WCD by subtracting the time at which the RAN expected the given WCD to transmit the message from the time at which the RAN received the message. In order to determine this unidirectional delay with a high degree of accuracy, the RAN may record the time that it received the first symbol of the message as the time that it received the message. Additionally, similar to how the RAN may determine an initial forward-link capacity factor to assign to the WCD based on a determined round-trip delay, the RAN may also do so for a determined unidirectional delay.

Of course, the RAN may use any combination of these wireless network characteristics (i.e., extent of probe messages, actual forward-link powers, round-trip delays, and WCD location) to determine an initial forward-link capacity factor for a WCD. Furthermore, the RAN may also use other characteristics, not discussed here, to determine the initial forward-link capacity factor.

The RAN may also take into consideration reverse-link power utilization on the carrier frequencies when assigning a given WCD to one of the carrier frequencies. Wireless networks in general, and CDMA wireless networks in particular, may suffer from a "near-far" problem on reverse-links. For instance, a wireless coverage area may support two WCDs, one near the RAN, the other far from the RAN. If both WCDs transmit simultaneously at equal powers, then the RAN may receive more power from the WCD that is near the RAN. If the difference in received powers at the RAN is large enough, the RAN may not be able to receive information from the far WCD, or may not be able to do so at a high enough data rate. CDMA systems mitigate the near-far problem by dynamically adjusting the reverse-link transmit power of WCDs so that near WCDs don't drown out far WCDs.

However, it may also be advantageous to assign WCDs to carrier frequencies so that instances of the near-far problem are reduced. For example, based on a number of probe messages received from a WCD, a DRC value received from the WCD, delay measurements between the RAN and WCD, WCD location, and/or other characteristics, the RAN may determine or estimate a distance between itself and the WCD. Then, the RAN may assign the WCD to a carrier frequency with similarly distant WCDs, such that the near-far problem on the reverse link may be mitigated.

IV. EXEMPLARY FLOW CHARTS

Figure 6A:
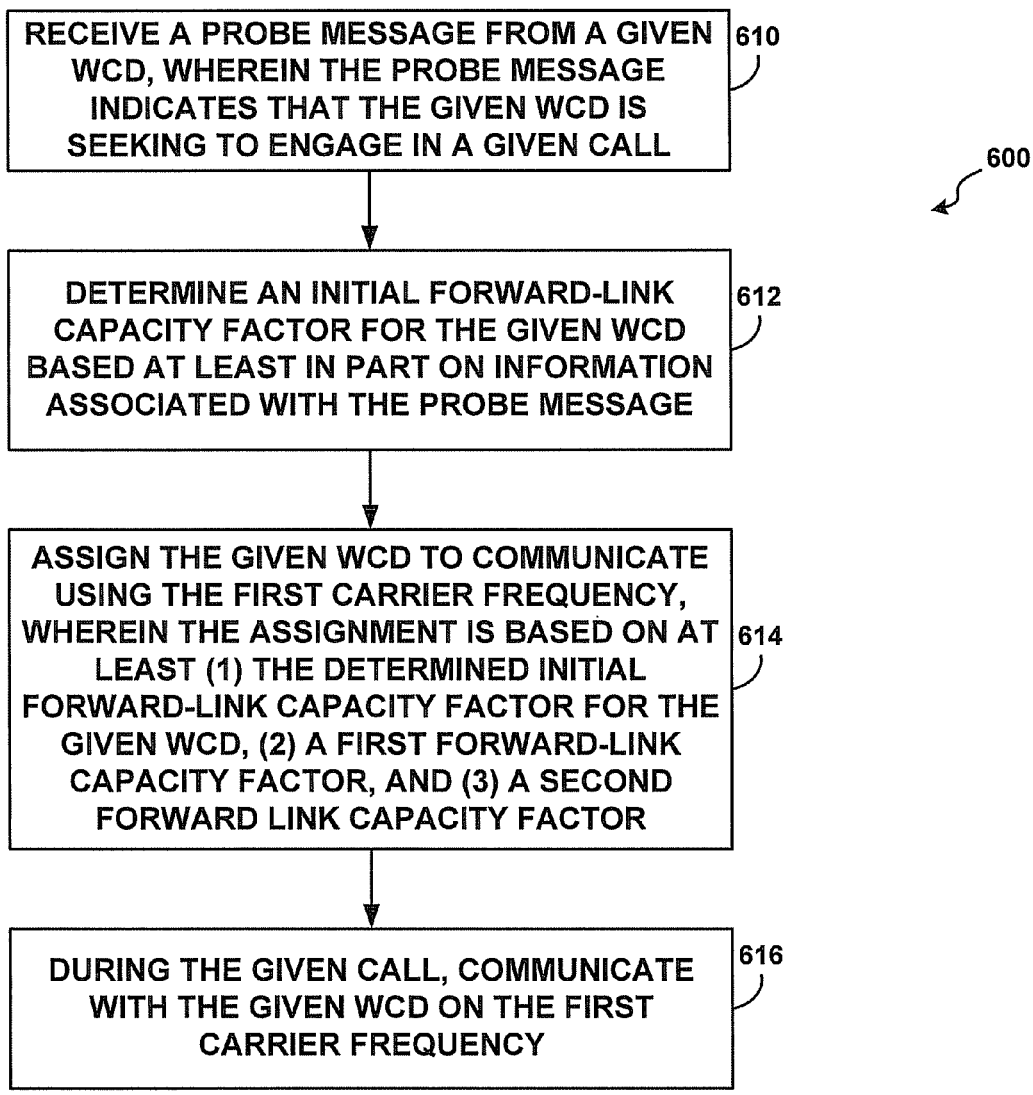
FIG. 6A is a flow chart in accordance with an exemplary embodiment.
Figure 7:
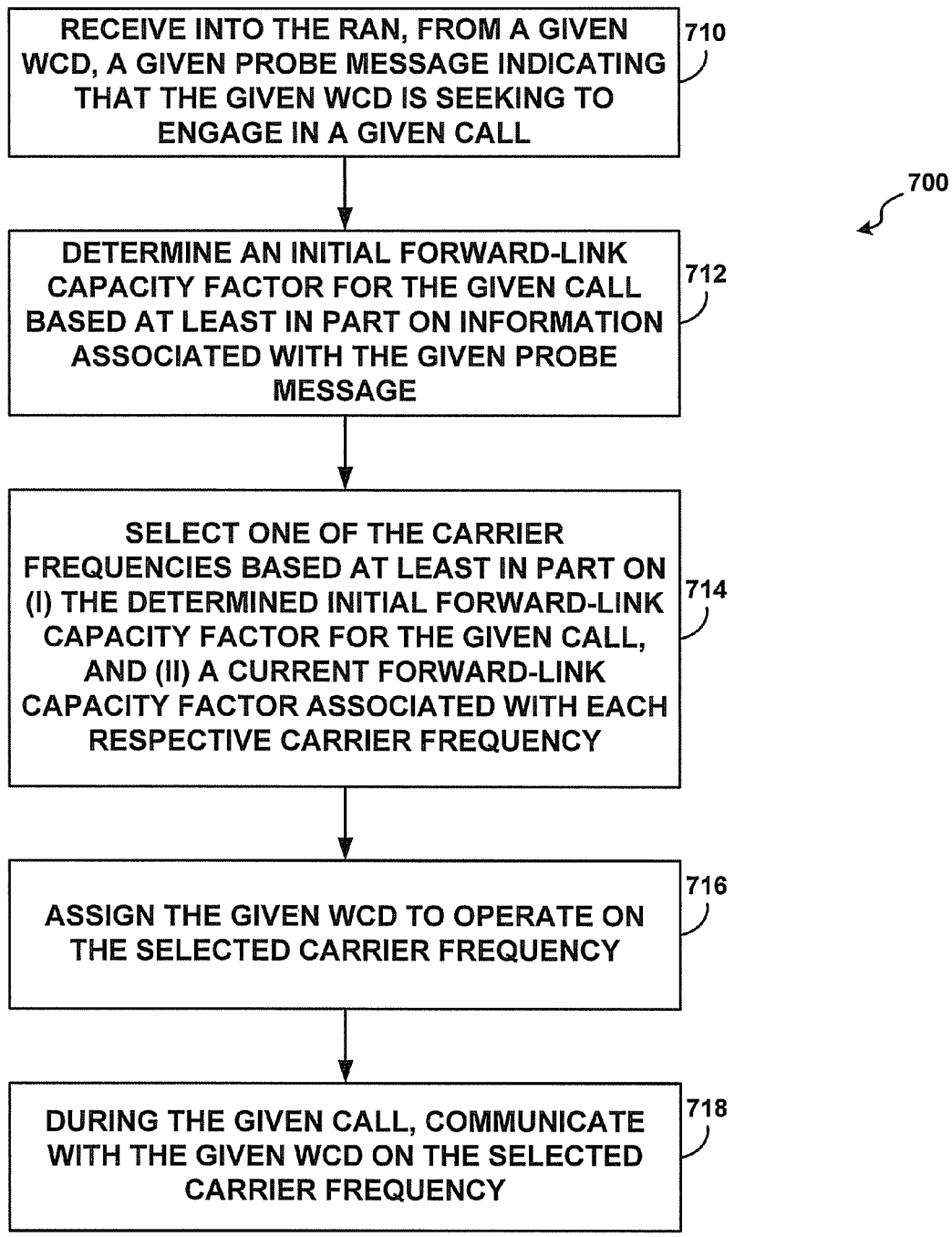
FIG. 7 is another flow chart in accordance with an exemplary embodiment.

FIGS. 6A and 7 are flow charts that depict methods in accordance with preferred embodiments. These methods are represented by respective sequences of steps or events. However, these steps or events may occur in a different order, and fewer or more steps or events may occur without departing from the scope of the embodiments. Moreover, the methods depicted in these flow charts may be combined with one another wholly or in part, to form additional embodiments that are also within the scope of this invention.

FIG. 6A is a flow chart of method 600, where method 600 preferably takes place at a RAN. The RAN may be radiating on at least first and second carrier frequencies to define a number of wireless coverage areas. At step 610, the RAN receives a probe message from a given WCD. The probe message may indicate that the given WCD is seeking to engage in a given call. Furthermore, the probe message may be one of an extent of probe messages transmitted by the given WCD to the RAN. At step 612, the RAN may determine an initial forward-link capacity factor for the given WCD based at least in part on information associated with the probe message. For example, this information may include an indication of the number of probe messages that the given WCD has transmitted to the RAN to engage in the given call. In addition to information associated with the probe message, the RAN may base the determination of the initial forward-link capacity factor for the given WCD on one or more other characteristics as well.

Turning momentarily to FIG. 6B, decision tree 650 illustrates some of the various techniques that the RAN may use to determine an initial forward-link capacity factor for the given WCD at block 660. In one example, at block 662, the RAN may determine the initial forward-link capacity factor from an extent of probe messages received from the given WCD. In doing so, the RAN may consult a table containing entries, each entry mapping a number of probe messages to an initial forward-link capacity factor. In another example, at block 664, the RAN may determine the initial forward-link capacity factor from an extent of probe messages mapped to actual values of forward-link capacity factor. In yet another example, at block 666, the RAN may determine the initial forward-link capacity factor from one or more methods of measuring a delay between the RAN and the given WCD. Some of these methods are described in blocks 668, 670, and 672, and once the RAN determines delay, the RAN may use this delay to further determine an appropriate initial forward-link capacity factor.

The method of determining delay in block 668 may be based on measuring a round-trip delay between the RAN and the given WCD. For example, the RAN may transmit a test message to the WCD, and the WCD may transmit a response to the test message to the RAN. The RAN may then use the test message and/or the response to determine a round-trip delay between itself and the given WCD.

The method of determining delay in block 670 may be based on timing associated with a message, such as a probe message, received from the given WCD. In a highly-synchronized wireless communication system, the RAN may determine a unidirectional delay between itself and the given WCD from when the RAN receives an initial part of a particular message from the given WCD.

The method of determining delay in block 672 may be based on the given WCD's location. The RAN may determine the given WCD's coordinates, such as the given WCD's GPS coordinates, and from these coordinates determine a unidirectional or round-trip delay between the RAN and the given WCD.

Of course the RAN may use other methods of determining an initial forward-link capacity factor for the given WCD. Regardless of exactly how the RAN accomplishes such a determination, at step 614 of FIG. 6A, the RAN may assign the given WCD to communicate using the first carrier frequency. This assignment may be based on at least (1) the determined initial forward-link capacity factor for the given WCD, (2) a first forward-link capacity factor associated with the first carrier frequency, and (3) a second forward-link capacity factor associated with the second carrier frequency. For example, the assignment may be based on an initial forward-link power associated with the given WCD, a first forward-link power associated with the first carrier frequency, and a second forward-link power associated with the second carrier frequency. Alternatively, the assignment may be based on an initial forward-link data rate associated with the given WCD, a first forward-link data rate associated with the first carrier frequency, and a second forward-link data rate associated with the second carrier frequency.

However, the RAN may also consider other characteristics. For instance, the RAN may prefer to choose a carrier frequency that is used to define more adjacent wireless coverage areas over a carrier frequency that is used to define fewer adjacent wireless coverage areas. In doing so, the RAN may "front-load" the chosen carrier frequency by assigning a disproportionate number of WCDs to this carrier frequency before engaging in more equitable forward-link-power-based load balancing across all carrier frequencies. The RAN may determine the carrier frequency in this way in order to reduce the likelihood of an inter-carrier handoff.

At step 616, the RAN may, during the given call, communicate with the given WCD on the first carrier frequency. This communication may include the exchange of bearer traffic between the WCD and the RAN on one or more forward-link and/or reverse-link traffic channels.

FIG. 7 is a flow chart of method 700, where method 700 preferably takes place at a RAN. The RAN may be radiating on a plurality of carrier frequencies to define a number of wireless coverage areas. At step 710, the RAN receives, from a given WCD, a given probe message indicating that the given WCD is seeking to engage in a call. The probe message may be one of an extent of probe messages transmitted by the given WCD to the RAN. At step 712, the RAN may determine an initial forward-link capacity factor for the given call based at least in part on information associated with the probe message. For instance, this information may include an indication of the number of probe messages that the given WCD has transmitted to the RAN to engage in the given call. In addition to information associated with the probe message, the RAN may also base the determination of the initial forward-link capacity factor for the given WCD on other characteristics. For example, the RAN may use any one or more of the methods of determining an initial forward-link capacity factor that were discussed in conjunction with FIG. 6B. Alternatively, the RAN may use other methods not discussed herein.

Regardless of how the RAN determines the initial forward-link capacity factor, at step 714, the RAN may select one of the various carrier frequencies based at least in part on the initial forward-link capacity factor for the given call and current forward-link capacity factor(s) associated with each respective carrier frequency. For instance, the RAN may select the carrier frequency in order to facilitate capacity factor load balancing across some or all of the carrier frequencies. Similar to the carrier frequency selection process discussed in reference to step 614 of FIG. 6A, the RAN may prefer to choose a carrier frequency that is used to define more adjacent wireless coverage areas over a carrier frequency that is used to define fewer adjacent wireless coverage areas, in order to reduce the likelihood of an inter-carrier handoff.

At step 716, the RAN may assign the given WCD to operate on the selected carrier frequency. In doing so, the RAN may ensure that the RAN radiates to the given WCD with at least the initial forward-link power. At step 718, during the given call, the RAN may communicate with given WCD on the selected carrier frequency. This communication may include the exchange of bearer traffic between the WCD and the RAN on one or more forward-link and/or reverse-link traffic channels.

V. EXEMPLARY RAN COMPONENT

Figure 8:
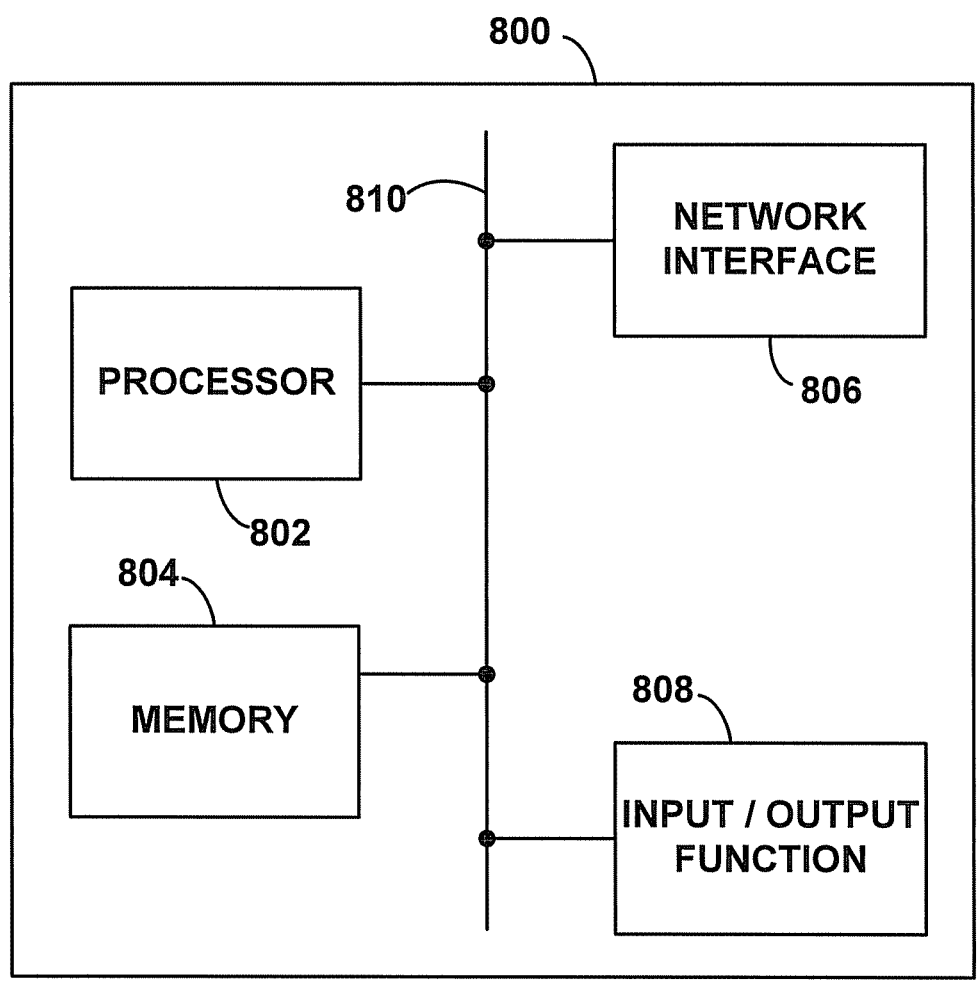
FIG. 8 depicts a radio access network element in accordance with an exemplary embodiment.

FIG. 8 is a simplified block diagram depicting exemplary RAN component 800. FIG. 8 illustrates some of the functional components that would likely be found in a RAN component arranged to operate in accordance with the embodiments herein. Example RAN component 800 preferably includes a processor 802, a memory 804, a network interface 806, and an input/output function 808, all of which may be coupled by a system bus 810 or a similar mechanism.

Processor 802 preferably includes one or more CPUs, such as one or more general purpose processors and/or one or more dedicated processors (e.g., application specific integrated circuits (ASICs) or digital signal processors (DSPs), etc.) Memory 804, in turn, may comprise volatile and/or non-volatile memory and can be integrated in whole or in part with processor 802. Memory 804 preferably holds program instructions executable by processor 802, and data that is manipulated by these instructions, to carry out various logic functions described herein. Alternatively, the logic functions can be defined by hardware, firmware, and/or any combination of hardware, firmware and software.

Network interface 806 may take the form of a wireline connection, such as an Ethernet, Token Ring, SONET, or T-carrier connection. Network interface 806 may also take the form of a wireless connection, such as IEEE 802.11, BLUETOOTH®, CDMA, WIMAX®, UMTS®, LTE®, or any other interface used to communicate with client nodes. However, other forms of physical layer connections and other types of standard or proprietary communication protocols may be used over network interface 806. Furthermore, network interface 806 may comprise multiple physical or logical network interfaces, each capable of operating according to the same or different protocols.

Input/output function 808 facilitates user interaction with example access node 800. Input/output function 808 may comprise multiple types of input devices, such as a keyboard, a mouse, a touch screen, and so on. Similarly, input/output function 808 may comprise multiple types of output devices, such as a monitor, printer, or one or more light emitting diodes (LEDs). Additionally or alternatively, example RAN component 800 may support remote access from another device, via network interface 806 or via another interface (not shown), such an RS-232 port.

By way of example, the data in memory 804 may contain information associated with performing any of the methods, processes, or functions described herein. For example, memory 804 may contain a representation of one or more WCDs, including information related to these WCDs, such as various types of identifiers, and/or forward-link capacity factor(s) associated with the WCD. Furthermore, memory 804 may contain a representation of one or more carrier frequencies that the RAN component may use to define wireless coverage areas. This representation may include a forward-link capacity factor associated with each wireless coverage area. Memory 804 may also contain program instructions that are executable by processor 802 to perform any of the methods, processes, or functions presented herein or represented by any of the accompanying figures.

VI. CONCLUSION

Exemplary embodiments have been described above. Those skilled in the art will understand, however, that changes and modifications may be made to these embodiments without departing from the true scope and spirit of the invention, which is defined by the claims.

What is claimed is:

1. A method, performed by a radio access network (RAN), wherein the RAN controls assignments of wireless communication devices (WCDs) to a first carrier frequency and a second carrier frequency, wherein the RAN radiates on the first carrier frequency to define a first wireless coverage area, wherein the RAN radiates on the second carrier frequency to define a second wireless coverage area, the method comprising:

receiving in the RAN a probe message from a given WCD, wherein the probe message indicates that the given WCD is seeking to engage in a given call;

determining an initial forward-link power for the given WCD based at least in part on information associated with the probe message;

assigning the given WCD to engage in the given call using the first carrier frequency, wherein the assignment is based on at least (1) the determined initial forward-link power for the WCD, (2) a first forward-link power associated with the first carrier frequency, and (3) a second forward-link power associated with the second carrier frequency; and during the given call, communicating with the given WCD on the first carrier frequency.

2. The method of claim 1, wherein determining the initial forward-link power for the WCD comprises:

determining that the probe message received from the given WCD is one of an extent of probe messages received from the given WCD, wherein the extent of probe messages all indicate that the given WCD is seeking to engage in the call; and determining, from the extent of probe messages, the initial forward-link power for the given WCD.

3. The method of claim 2, wherein the RAN performs a plurality of assignments of WCDs to carrier frequencies, wherein each assignment of a WCD to a carrier frequency is based on an extent of probe messages received from the WCD for a call, the method further comprising:
- recording mappings for the assignments, wherein, for each assignment, a mapping correlates (i) the extent of probe messages received from the WCD for the call with (ii) an actual forward-link power associated with the WCD during at least part of the call; and
- using at least a most recent subset of the mappings as a further basis to determine the initial forward-link power for the given WCD.

4. The method of claim 1, further comprising:
- in response to receiving the probe message from the given WCD, determining a round trip delay between the RAN and the given WCD, wherein determining the initial forward-link power for the given WCD is also based on the determined round trip delay.

5. The method of claim 4, wherein determining the round trip delay comprises:
- transmitting, at a first time, a test message to the given WCD;
- receiving, at a second time, a response to the test message from the given WCD; and
- calculating the round trip delay based on a difference between the second time and the first time.

6. The method of claim 4, wherein the RAN and the WCD communicate according to code division multiple access (CDMA) principles, wherein determining the round trip delay comprises:
- receiving, at a first time, an initial symbol of a CDMA code of the probe message from the WCD;
- reading, from the probe message, a timestamp representing a second time at which the probe message was transmitted; and
- calculating the round trip delay based on a difference between the first time and the second time.

7. A method, performed by a radio access network (RAN), wherein the RAN performs assignments of wireless communication devices (WCDs) to carrier frequencies, wherein on each carrier frequency the RAN radiates to define a wireless coverage area, the method comprising:
- recording mapping data for the assignments, wherein the mapping data specifies respectively, for each assignment of a WCD to a carrier frequency for a call, a correlation between (i) an extent of probe messages transmitted by the WCD in an effort to engage in the call and (ii) an actual forward-link capacity factor associated with the WCD during at least part of the call;
- receiving into the RAN, from a given WCD, a given probe message indicating that the given WCD is seeking to engage in a given call;
- determining an initial forward-link capacity factor for the given call based at least in part on information in the given probe message and the mapping data;
- selecting one of the carrier frequencies based at least in part on (i) the determined initial forward-link capacity factor for the given call and (ii) forward-link capacity factors respectively associated with each carrier frequency;
- assigning the given WCD to operate on the selected carrier frequency; and
- during the given call, communicating with the given WCD on the selected carrier frequency.

8. The method of claim 7, wherein selecting one of the carrier frequencies is also based on an adjacent wireless coverage area being defined using the selected carrier frequency.

9. The method of claim 7, wherein information in the given probe message comprises an indication of an extent of probe messages sent by the given WCD in an effort to engage in the given call.

10. The method of claim 7, wherein selecting one of the carrier frequencies is also based on reverse-link powers respectively associated with each carrier frequency.

11. The method of claim 7, wherein the given WCD receives the given call and the probe message is of a type selected from the group consisting of a page response message and an origination message.

12. A radio access network (RAN) component, wherein the RAN component performs assignments of wireless communication devices (WCDs) to carrier frequencies, wherein on each carrier frequency the RAN currently radiates to define a wireless coverage area, the RAN component comprising:
- a processor;
- memory;
- program instructions stored in the memory and executable by the processor to store, in the memory, mappings between historical data representing: (1) extents of probe messages respectively received from a set of WCDs seeking to engage in calls, and (2) actual forward-link capacity factors used to communicate with each of the respective WCDs in the set, when each respective WCD is engaged in its respective call;
- program instructions stored in the memory and executable by the processor to receive into the RAN component, from a given WCD, a given probe message indicating that the given WCD is seeking to engage in a given call;
- program instructions stored in the memory and executable by the processor to determine an initial forward-link capacity factor for the given call based at least in part on information in the given probe message and historical data from the mappings;
- program instructions stored in the memory and executable by the processor to select one of the carrier frequencies based at least in part on (i) the determined initial forward-link capacity factor for the given call, and (ii) a current forward-link capacity factor respectively on each carrier frequency;
- program instructions stored in the memory and executable by the processor to assign the given WCD to operate on the selected carrier frequency; and
- program instructions stored in the memory and executable by the processor to communicate with the given WCD on the selected carrier frequency.

13. The RAN component of claim 12, wherein program instructions stored in the memory and executable by the processor to determine the forward-link capacity factor for the WCD comprise:
- program instructions stored in the memory and executable by the processor to determine that the probe message received from the WCD is one of an extent of probe messages received from the WCD, wherein each probe message of the extent of probe messages indicates that the WCD is seeking to engage in the call; and
- program instructions stored in the memory and executable by the processor to determine, from the extent of probe messages, the forward-link capacity factor for the WCD.

14. The RAN component of claim 12, wherein information in the probe message comprises an indication of a number of probe messages sent by the WCD in order to engage in the call, the RAN component further comprising:
- program instructions stored in the memory and executable by the processor to read the number from the probe message, and wherein program instructions stored in the memory and executable by the processor to select one of the carrier frequencies comprise program instructions stored in the memory and executable by the processor to select one of the carrier frequencies also based on the number.

15. The RAN component of claim 12, wherein the first carrier frequency is also used to define a third wireless coverage area, wherein the third wireless coverage area is adjacent to the first wireless coverage area, and wherein program instructions stored in the memory and executable by the processor to select one of the carrier frequencies comprise:

program instructions stored in the memory and executable by the processor to select one of the carrier frequencies also based on (1) the third wireless coverage area using the first carrier frequency, and (2) the third wireless coverage area being adjacent to the first wireless coverage area.

16. The RAN component of claim 12, wherein program instructions stored in the memory and executable by the processor to select one of the carrier frequencies comprise:

program instructions stored in the memory and executable by the processor to select one of the carrier frequencies also based on a round trip delay between the RAN and the WCD.

17. A method, performed by a radio access network (RAN), wherein the RAN controls assignments of wireless communication devices (WCDs) to a first carrier frequency and a second carrier frequency, wherein the RAN radiates on the first carrier frequency to define a first wireless coverage area, wherein the RAN radiates on the second carrier frequency to define a second wireless coverage area, the method comprising:

receiving, in the RAN, a probe message from a given WCD, wherein the probe message indicates that the given WCD is seeking to engage in a given call;

determining an initial forward-link data rate for the given WCD based at least in part on information associated with the probe message;

assigning the given WCD to engage in the given call using the first carrier frequency, wherein the assignment is based on at least (1) the determined initial forward-link data rate for the WCD, (2) a first forward-link data rate associated with the first carrier frequency, and (3) a second forward-link data rate associated with the second carrier frequency; and during the given call, communicating with the given WCD on the first carrier frequency.

* * * * *